(12) United States Patent
Cabral et al.

(10) Patent No.: US 10,474,896 B2
(45) Date of Patent: Nov. 12, 2019

(54) IMAGE COMPRESSION USING CONTENT CATEGORIES

(71) Applicant: Facebook, Inc., Menlo Park, CA (US)

(72) Inventors: Brian Keith Cabral, San Jose, CA (US); Daniel Hugenroth, London (GB); Ibrahim Okuyucu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 118 days.

(21) Appl. No.: 15/653,306

(22) Filed: Jul. 18, 2017

(65) Prior Publication Data

US 2019/0026555 A1  Jan. 24, 2019

(51) Int. Cl.

| | | |
|---|---|---|
| *G06K 9/00* | (2006.01) | |
| *G06F 17/11* | (2006.01) | |
| *H04N 19/00* | (2014.01) | |
| *G06F 16/583* | (2019.01) | |
| *H04N 19/115* | (2014.01) | |
| *H04N 19/124* | (2014.01) | |
| *H04N 19/136* | (2014.01) | |
| *H04N 19/174* | (2014.01) | |
| *G06F 16/55* | (2019.01) | |
| *H04N 1/40* | (2006.01) | |

(52) U.S. Cl.
CPC ......... *G06K 9/00664* (2013.01); *G06F 16/55* (2019.01); *G06F 16/583* (2019.01); *G06F 17/11* (2013.01); *G06K 9/00684* (2013.01); *H04N 19/00* (2013.01); *H04N 19/115* (2014.11); *H04N 19/124* (2014.11); *H04N 19/136* (2014.11); *H04N 19/174* (2014.11); *H04N 1/40062* (2013.01)

(58) Field of Classification Search
CPC .......... G06K 9/00664; G06F 17/30247; G06F 17/11; H04N 19/00; H04N 1/40062
See application file for complete search history.

(56) References Cited

U.S. PATENT DOCUMENTS

2018/0295255 A1* 10/2018 Lu ........................... H03M 7/30

\* cited by examiner

*Primary Examiner* — Ruiping Li
(74) *Attorney, Agent, or Firm* — Baker Botts L.L.P.

(57) ABSTRACT

In one embodiment, a method includes analyzing content of an image, identifying a category of the image based on the analyzed content of the image, identifying, based on the category of the image, a set of one or more compression parameters for a compression algorithm, and compressing the image using the compression algorithm, wherein the compression parameters are provided as input to the compression algorithm. The category of the image may include a category of an object depicted in the image, and identifying the category of the image may include detecting one or more objects in the image, selecting a primary subject of the image from the objects in the image, and identifying a category of the primary subject, wherein the category of the image comprises the category of the primary subject. The primary subject may be the largest of the objects in the image.

17 Claims, 7 Drawing Sheets

Original Image
(No compression)
Quality=1.0
Size Reduction=0

*FIG. 3A*

JPEG
Quality
Parameter=90

Quality=0.8
Reduction=0.4

*FIG. 3B*

JPEG
Quality
Parameter=50

Quality=0.4
Reduction=0.7

*FIG. 3C*

JPEG
Quality
Parameter=10

Quality=0.2
Reduction=0.8

IMAGE COMPRESSION USING CONTENT CATEGORIES

TECHNICAL FIELD

This disclosure generally relates to compressing graphical images on computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, when an image is to be compressed, a content category may be selected based on an object depicted in the image, and a compression algorithms and/or compression parameters for that content category may be selected by a machine-learning model. The content category of the image may be identified using an image classification technique, such as image segmentation, which categorizes objects depicted in images. For example, the content category may be "tree" or "nature" for a tree, or "face" or "human" for a human face depicted in the image. The machine learning model may be trained on a set of training images to associate compression algorithms and/or compression parameters with the content categories for which the algorithms and/or parameters perform best in the training process. During the training process, an objective function may measure the compression quality and reduction in file size resulting from each candidate compression algorithm and candidate parameter set for a particular content category in the training image. The training process may select the candidate compression algorithm and/or candidate parameter set from defined ranges or sets of possible values, and may choose a different candidate algorithm and/or candidate parameter set during the training process based on the results of compressing training images using the candidate algorithms and/or parameter sets. The machine learning model may learn which candidate algorithm and/or parameter set produces the best trade-off between compressed image quality and reduction in image size in a set of evaluated candidates for each content category encountered in the training images.

DESCRIPTION OF EXAMPLE EMBODIMENTS

System Overview

Figure 1:
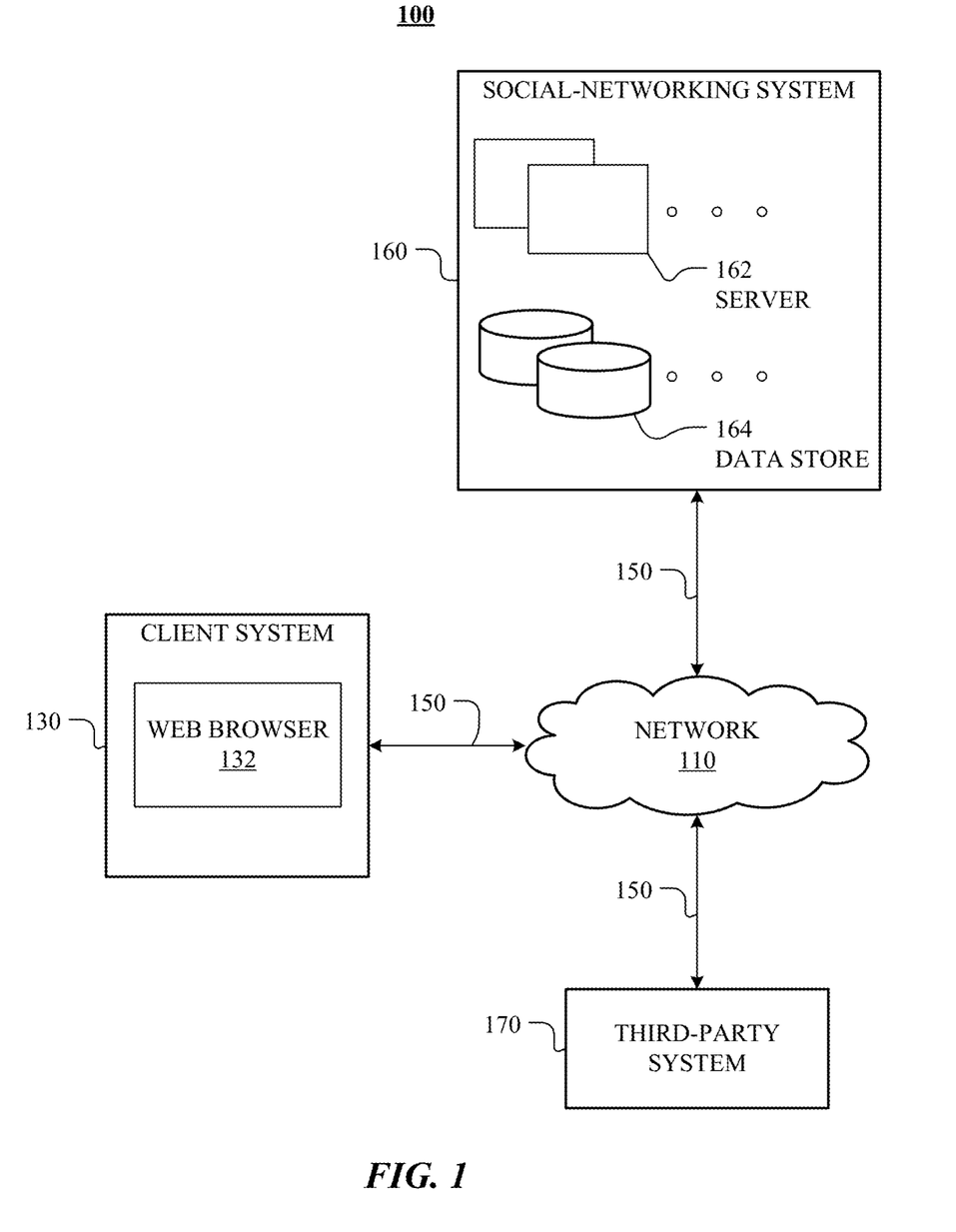
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Social Graphs

Figure 2:
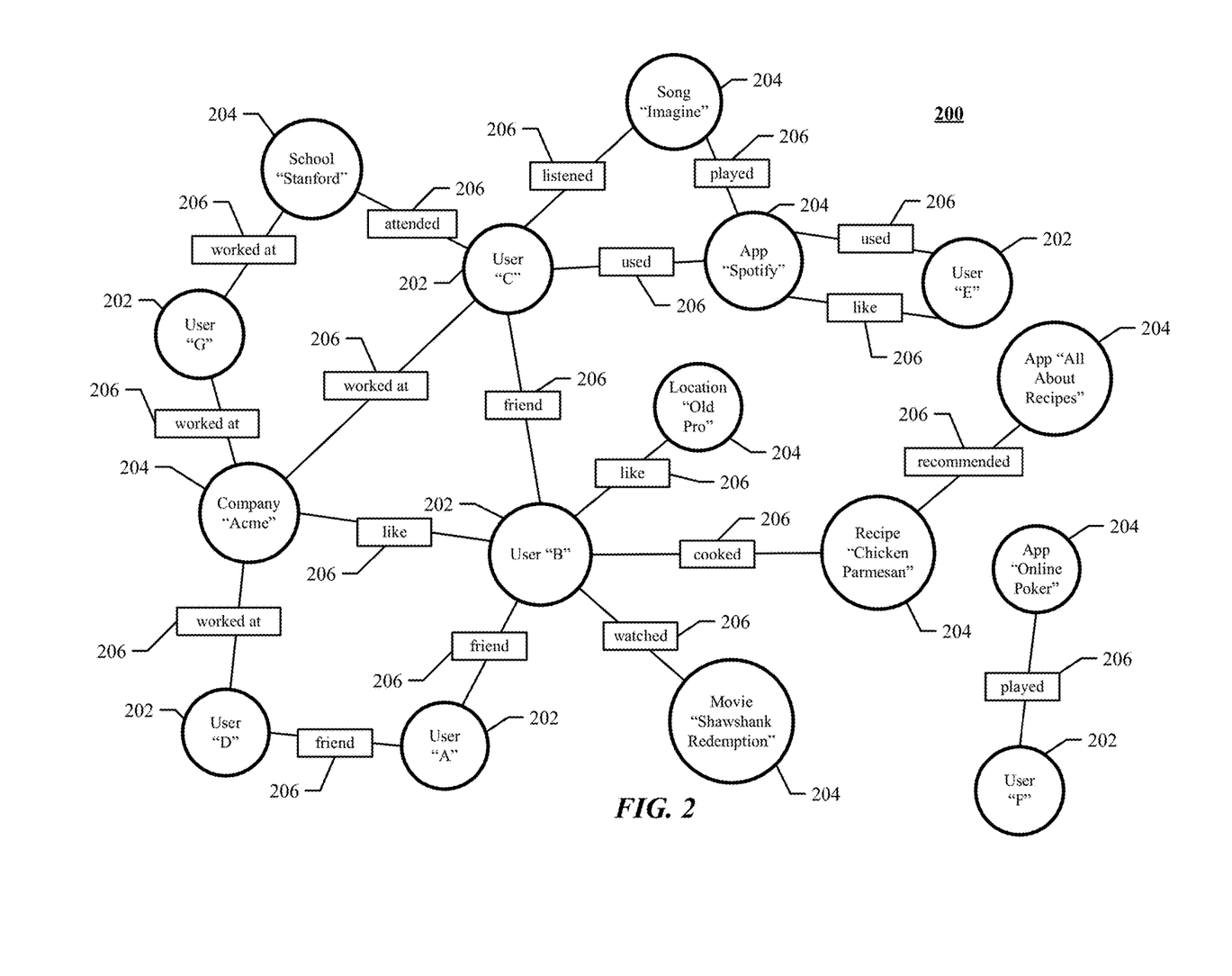
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Image Compression

In particular embodiments, when an image is to be compressed, a content category may be selected based on an object depicted in the image, and a compression algorithms and/or compression parameters for that content category may be selected by a machine-learning model. The content category of the image may be identified using an image classification technique such as image segmentation that categorizes objects depicted in images. For example, the content category may be "tree" or "nature" for a tree, or "face" or "human" for a human face depicted in the image. The machine learning model may be trained on a set of training images to associate compression algorithms and/or compression parameters with the content categories for which the algorithms and/or parameters perform best in the training process. During the training process, an objective function may measure the compression quality and reduction in file size resulting from each candidate compression algorithm and candidate parameter set for a particular content category in the training image. The training process may select the candidate compression algorithm and/or candidate parameter set from defined ranges or sets of possible values, and may choose a different candidate algorithm and/or candidate parameter set during the training process based on the results of compressing training images using the candidate algorithms and/or parameter sets. The machine learning model may learn which candidate algorithm and/or parameter set produces the best trade-off between compressed image quality and reduction in image size in a set of evaluated candidates for each content category encountered in the training images.

Videos and images may consume a substantial amount of resources, often in the range of tens to hundreds of megabytes for an image file or one minute of video. Sending such large quantities of data via a communications network at an acceptable rate may be difficult or impractical, particularly for lower-bandwidth networks that may be used by mobile devices. Storing such quantities of data may also be problematic on mobile devices that have limited storage capacity. Videos and images are often used in mobile applications, however, and reducing the size of videos and images may significantly increase the usefulness of mobile applications to users.

Although videos and images may be compressed, there are trade-offs between the costs and benefits of compression, so particular compression algorithms may be more effective than others. The costs may include reduction in image quality and the execution time of the compression algorithm. The benefits may include the reduction in size of the image. The effectiveness of a compression algorithm may be measured by a combination of the changes in image size and quality in the compressed images relative to the corresponding original images.

Existing image compression algorithms, such as JPEG, have compression parameters, such as a compression quality and quantization tables, bit rate, and other parameters, which can modify the behavior of the compression algorithms to be more effective for compressing particular kinds of images. However, such parameters are ordinarily set statically, e.g., by an application or operating system, to a default set of values. For example, compressing an image using the JPEG compression algorithm with a high compression quality parameter (e.g., 90) may generate compressed images that are reduced in size by a relatively small amount (e.g., by 30%) while retaining good image quality (e.g., few visible differences between an original image and a compressed image). However, a more aggressive compression quality (e.g., 30) may generate compressed images that are reduced in size by a larger amount (e.g., by 80%) but have poor image quality (e.g., appear distorted or pixelated because of compression artifacts). There may be an optimum compression algorithm or quality parameter for each image, but the optimum algorithm or quality parameter may be different for different images, e.g., depending on the content of the image. For example, the JPEG algorithm with a compression quality parameter of 60 may generate good results for images of scenes in nature that appear similar to the originals, but poor results for images that contain sharply-defined edges, such as objects with well-defined edges. The PNG algorithm, for example, is lossless, and may produce better results than JPEG for objects with well-defined edges. The PNG compression does not ordinarily reduce image size by as much as JPEG. However, PNG has parameters that may be adjusted to reduce file size.

Figure 3A:
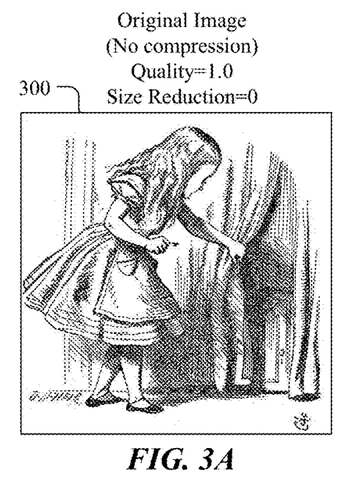
FIG. 3A illustrates an example image suitable for compression by a compression algorithm.

FIG. 3A illustrates an example image 300 suitable for compression by a compression algorithm. The image 300 depicts content, which includes content objects such as a girl named Alice, a key, a curtain, and a door. The image 300 may have been generated by a digital camera, a digital scanner, a computer program, or other suitable source. The image 300 may be represented in a memory of a computer system as an array of pixel values and a set of metadata values. The image 300 may be a frame of a video. The metadata may include information related to the image, such as the camera sensor size, exposure settings, date and location, author, and the like. The image 300 is referred to herein as an original image, since the image 300 has not been modified since being generated. The image compression techniques described herein involve compressing images such as the original image 300 to form compressed images, which are ordinarily smaller in size (e.g., stored in fewer bytes) than the corresponding original images. Image compression may be lossless, in which case the compressed image includes essentially all content information of the original image, or lossy, in which case the compressed image does not include at least some of the original image's content information. There are numerous image compression algorithms, including lossless algorithms such as run-length encoding (RLE), BMP (WINDOWS bitmap), Graphics Interchange Format (GIF), Portable Network Graphics (PNG), and Tagged Image File Format (TIFF). Lossy image compression algorithms, such as the Discrete Cosine Transform (DCT), which is used by the Joint Photographic Experts Group (JPEG) algorithm, wavelet transform, and others. Lossy video compression algorithms include Motion JPEG, MPEG, H.264, and so on.

Determining which compression algorithm is the best one to use for a particular image or in a particular application is ordinarily difficult, since certain algorithms may generate smaller compressed images than others, depending on the content of the original image. For lossy compression, certain algorithms may generate compressed images that look better than those produced by other algorithms. Further, each compression algorithm may have parameters that can adjust the compression process to produce better results for particular types of image content. For example, the JPEG algorithm's parameters include a compression quality (also referred to as compression ratio) and quantization tables. The compression quality parameter specifies how aggressively the image is compressed, and may be a value in the range 1 to 100, with 1 corresponding to low quality, high size reduction and 100 corresponding to high quality, low size reduction. Thus, to compress a particular image, the best results may be achieved by selecting both the best compression algorithm and the best parameters to provide to the algorithm for that image.

The best results for compressing a particular original image may correspond to the compressed image that is smaller in size than other compressed images produced from the same original image (at least in comparison to other compressed images that have been generated for evaluation). Thus, the effectiveness of a compression algorithm may be measured at least in part by the size reduction of compressed images relative to original images. The size reduction may be represented as a number between 0 and 1, e.g., 0.6 corresponding to a 60% reduction in size. For a lossy compression algorithm, the best results may also correspond to the compressed image that is most similar to the original image, particularly as perceived by human vision. The similarity of a compressed image to an original image (e.g., as would be perceived by human vision) is referred to herein as the quality of the compressed image. The quality of a compressed image relative to an original image may be measured using a Structural Similarity (SSIM) index, a Multi-Scale SSIM (MSSIM) index, a Structural Dissimilarity index (DSSIM), or the like. The quality of a compressed video may be measured as an average of the SSIM values of the frames in the video, or a time-aware version of SSIM, for example. Thus, the effectiveness of a lossy compression algorithm may be measured at least in part by the quality of the compressed images. The quality may be represented as a number between 0 and 1, e.g., 0.7 corresponding to a quality that is 70% of the original image. Thus, for lossy compression, the best results may correspond to the compressed image having the highest combined quality and size reduction. The combined quality and size reduction may be calculated as the sum of the quality and size reduction, subject to constraints such as a minimum acceptable quality (e.g., 0.5, 0.75, or the like), a minimum acceptable size reduction (e.g., 40%, 50%, 60%, or the like), and/or a constraint indicating whether to select higher quality or higher size reduction in case of ties between higher quality+lower size reduction and lower quality+higher size reduction. A user may request a different tradeoff, e.g., to prioritize compression over image quality or vice-versa.

Figure 3B:
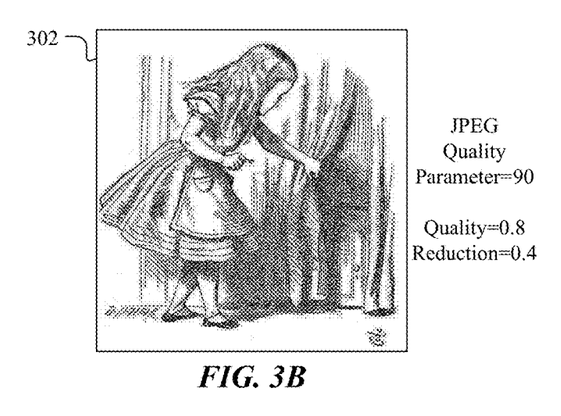
FIGS. 3B-3D illustrate example compressed images generated using different compression parameters.
Figure 3C:
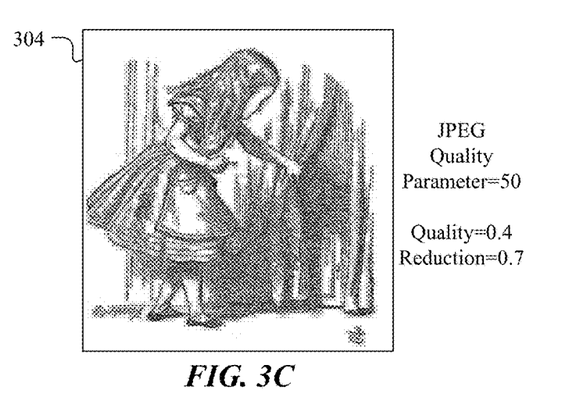
Figure 3D:
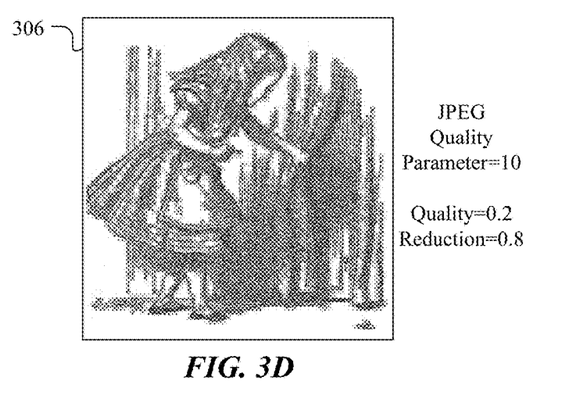

FIGS. 3B-3D illustrate example compressed images generated using different compression parameters. FIG. 3B illustrates a compressed image 302 generated by the JPEG compression algorithm using a compression quality parameter equal to 90. The compressed image 302 looks similar to the original image 300, but has distorted details in some areas. The JPEG algorithm produces these distortions, which are referred to as artifacts, as a result of the quantization process that divides the image into blocks and discards information from the image. The artifacts may appear as blocks that have a single color in place of a region of the image when the compressed image is uncompressed and displayed. The measured effectiveness of the JPEG compression algorithm with quality parameter=90 in this example is quality=0.8 (e.g., as measured by structural similarity) and size reduction=0.4 (e.g., as measured by change in file size). The total effectiveness may be determined based on a combination of the quality and size reduction, e.g., quality+size reduction=1.2 (on a scale of 0 to 2).

FIG. 3C illustrates a compressed image 304 generated by the JPEG compression algorithm using a compression quality parameter equal to 50. Since the compression is more aggressive than in FIG. 3B, to reduce the file size further at the cost of lower quality, the compressed image 304 has lower quality than the compressed image 302, and looks less similar to the original image 300. The compressed image 304 has more distortions, e.g., more artifacts, than the compressed image 302. The measured effectiveness of the JPEG compression algorithm with quality parameter=50 in this example is quality=0.4 and size reduction=0.7. The total effectiveness may be, e.g., quality+size reduction=1.1.

FIG. 3D illustrates a compressed image 306 generated by the JPEG compression algorithm using a compression quality parameter equal to 10. Since the compression is more aggressive than in FIG. 3C, to reduce the file size even further at the cost of even lower quality, the compressed image 306 has lower quality than the compressed image 304, and looks less similar to the original image 300. The compressed image 306 has more distortions, e.g., more artifacts, than the compressed image 304. The measured effectiveness of the JPEG compression algorithm with quality parameter=10 in this example is quality=0.2 and size reduction=0.8. The total effectiveness may be, e.g., quality+size reduction=1.0.

Figure 4:
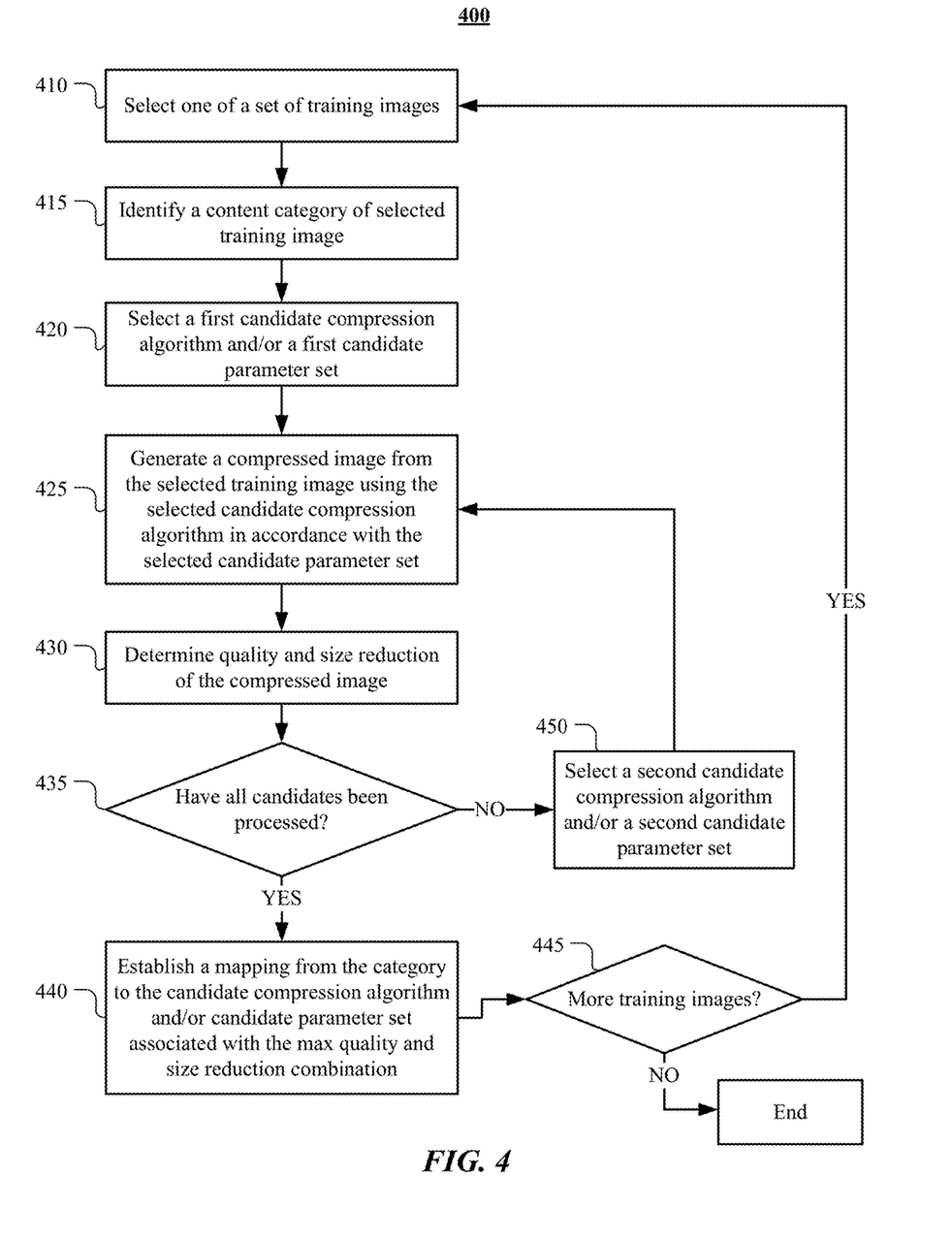
FIG. 4 illustrates an example method for training a machine-learning model to perform image compression based on content categories.

FIG. 4 illustrates an example method 400 for training a machine-learning model to perform image compression based on content categories. The method may begin at step 410 by selecting one of a set of training images. At step 415, the method may identify a content category of selected training image. The content category be a category of the image itself, such as a style of the image, e.g., a true-color photograph or a clipart image containing text captions. For example, a true-color photo may have soft edges, for which JPEG is likely to be effective, whereas a clipart image or an image containing text captions may have hard edges, for which an algorithm such as PNG is likely to be more effective than JPEG.

In particular embodiments, the content category may be identified in the compression domain of the image. For example, the JPEG algorithm uses a discrete cosine transform to convert the image into the frequency domain, so the category of the image may be determined based on information in the frequency domain. Categories determined in the frequency domain do not necessarily have meaning to humans. For example, sharp edges, such as of printed text, in an image may have a certain frequency signature, and the image may be categorized based on the frequency signature.

In particular embodiments, the content category of an image may be determined based on user affinity. For example, a primary subject in the image may be selected based on the user's affinity with different objects detected in the image, where the user is the user capturing the image. The primary subject may be the object whose category is used as the image's content category.

At step 420, the method may select a first candidate compression algorithm and/or a first candidate parameter set. That is, the method 400 may be used to train the model to select either a learned compression algorithm, which may be used with a "static" (e.g., not learned) set of compression parameters, learned a set of compression parameters to be used with a static algorithm, or a combination of both learned a compression algorithm and a learned set of compression parameters for the algorithm. The techniques for learning compression algorithms are similar to the techniques for learning compression parameters. For example, a compression algorithm may be represented as a compression parameter that specifies the algorithm to be used with the other compression parameters.

In particular embodiments, parameters that may be used include, for example, the JPEG compression quality and JPEG quantization tables. The quantization tables may be encoded in each file and may instruct the compression and decompression portions of the JPEG algorithm how to compress and decompress the file. JPEG includes four modes of operation: Sequential DCT-based mode, Progressive DCT-based mode, Lossless mode, and Hierarchical mode, and the operation mode may be used as a parameter.

In particular embodiments, an object may be identified in a particular region of the image, and the content category corresponding to each region may be identified. Each region may then be compressed using the parameters identified for the region using the trained machine-learning model. JPEG 2000 features may be used to associate different parameters with different regions of an image.

At step 425, the method may generate a compressed image from the selected training image using the selected candidate compression algorithm in accordance with the selected candidate parameter set. At step 430, the method may determine a quality and/or size reduction of the compressed image. Step 430 may invoke an objective function such as the method 500 of FIG. 5 to determine a combination of the quality and size reduction of the compressed image. Either the quality or the size reduction may be omitted, in which case the result of the objective function is the remaining metric, e.g., the size reduction or the quality, respectively. For example, if the method 400 is used to learn parameters for a lossless compression algorithm, then the quality may be omitted from the methods of FIGS. 4 and 5.

In particular embodiments, as an alternative or in addition to determining the quality using the objective function, the quality of compression may be determined based on user feedback on one or more of the training images. In particular embodiments, the user feedback may be accomplished by presenting different images to different users to determine which images users tend to click on, in a form of AB testing. For example, two different compressed images generated from the same original image using different compression algorithms and/or different compression parameters may be presented to a user. The user may be asked to select which image looks more like the original image, and the user feedback may be the selected image (either the first or second compressed image).

At step 435, the method may determine whether all candidates in the candidate lists (e.g., candidate compression algorithms) and/or candidate ranges (e.g., candidate parameter sets) have been processed, e.g., used to generate compressed images and to measure the effectiveness of the compression. If so, the method continues at step 440. If not, the method continues at step 450, which leads to processing of other candidates.

Alternatively, step 435 may determine whether the quality, size reduction, or a combination of both satisfies a different threshold condition, such as being greater than a threshold value, e.g., either the quality or size reduction being greater than 0.5, 0.75, or 0.8, or the sum of the quality and size reduction being greater than 1.0, 1.25, 1.5, 1.7, or the like.

At step 440, the method may train the machine learning model that the candidate compression algorithm and/or candidate parameter set having the maximum combined quality and size reduction (of those measured for the training image or, alternatively, of those measured for all training images having the same content category as the training image) are effective for compressing images of the content category identified for the training image.

At step 445, the method may determine whether there are more unprocessed training images. If so, the method continues at step 410 by selecting another training image that has not been processed in the current execution of the method and continuing on to process that training image. If there are no more unprocessed training images, the method ends.

At step 450, the method may select a second candidate compression algorithm and/or a second candidate parameter set. In particular embodiments, the second candidate compression algorithm may be selected from a list of compression algorithms. For example, the list may include the GIF, TIFF, BMP, and JPEG algorithms. Initially, step 420 may select the first algorithm in the list, e.g., GIF. The method may then continue at step 425 using the second candidate compression algorithm and/or the second candidate parameter set as the selected candidate compression algorithm and the selected candidate parameter set, and so on for each iteration through the list of candidate algorithms. Candidate parameter sets may be generated similarly by iterating through lists of candidate parameter values for parameters that have a relatively small number of values (e.g., less than 10), or by iterating through a numeric range (e.g., by iterating through the range 1 to 100 by tens for the JPEG compression quality parameter, if ten evenly-distributed parameters are to be evaluated). In particular embodiments, the number of candidate algorithms and parameter sets evaluated for each training image may be, e.g., in the tens to hundreds of sets. For example, the number of candidate parameter sets may be 10, 50, 100, 200, 500, or the like.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order.

Moreover, although this disclosure describes and illustrates an example method for training a machine-learning model to perform image compression based on content categories including the particular steps of the method of FIG. 4, this disclosure contemplates any suitable method for training a machine-learning model to perform image compression based on content categories including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
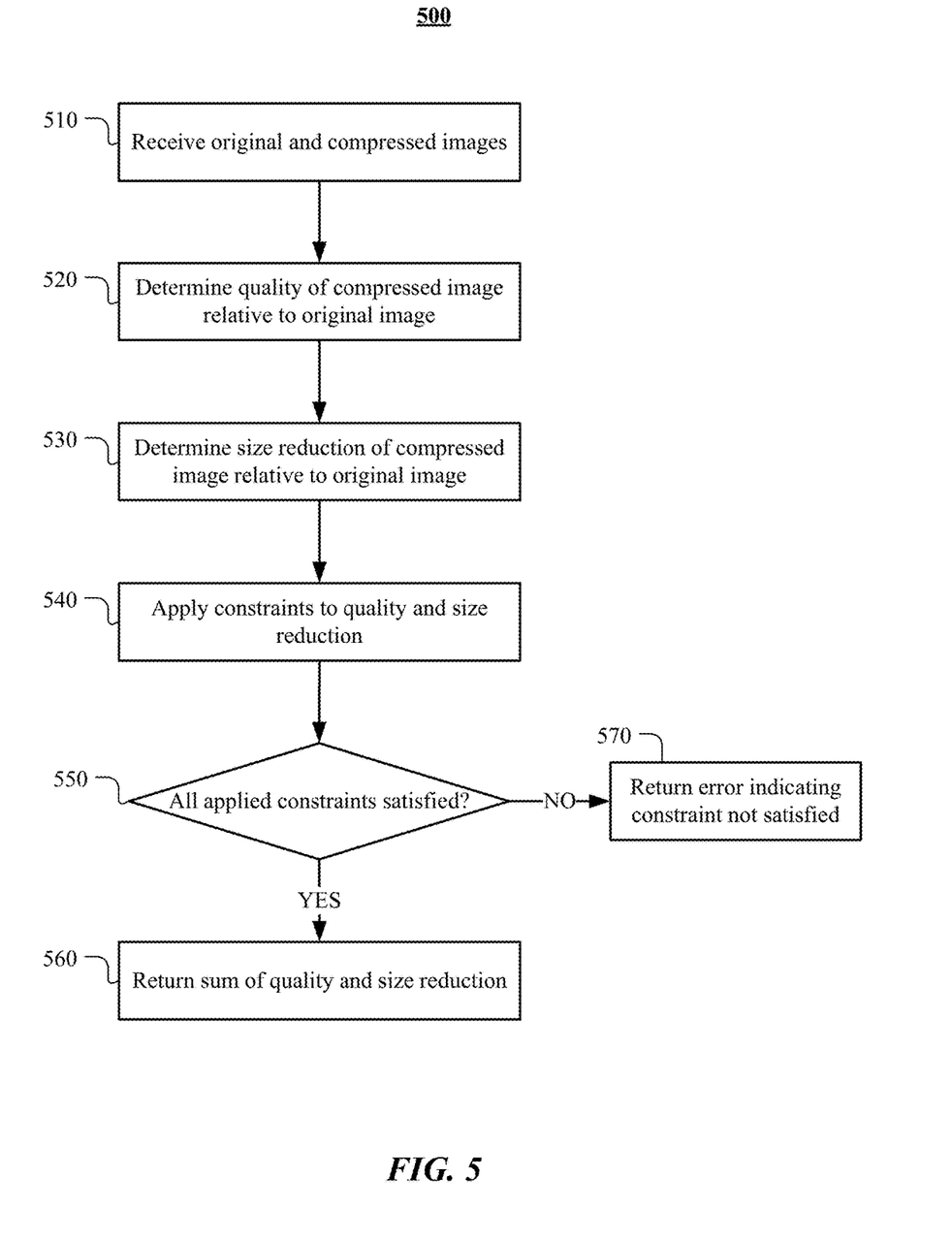
FIG. 5 illustrates an example method for assessing the quality and size-reduction of a compressed image.

FIG. 5 illustrates an example method 500 for assessing the quality and size-reduction of a compressed image. The method 500 may be an objective function invoked by a machine-learning training process. For example, the method 500 may be invoked by step 430 of the training method 400 to determine the quality and size reduction of a compressed image. The method may begin at step 510 by receiving original and compressed images to be compared.

At step 520, the method may determine the quality of the compressed image relative to the original image. The quality of compressed images may be evaluated by comparing the compressed image to the original image using techniques such as multi-scale similarity (MSSIM), single-scale similarity (SSIM), peak signal-to-noise ratio (PSNR), or the like. At step 530, the method may determine the size reduction of the compressed image relative to the original image. At step 540, the method may apply constraints to the determined quality and size reduction. At step 550, the method may determine whether all constraints that were applied at step 540 are satisfied. If so, the method may continue to step 560 to return a sum of the determined quality and size reduction. If not, the method may continue at step 570 to return an error indicating a constraint is not satisfied, so that the compression algorithm and/or parameters that generated the compressed image are not eligible to be learned.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order.

Moreover, although this disclosure describes and illustrates an example method for assessing the quality and size-reduction of a compressed image including the particular steps of the method of FIG. 5, this disclosure contemplates any suitable method for assessing the quality and size-reduction of a compressed image including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
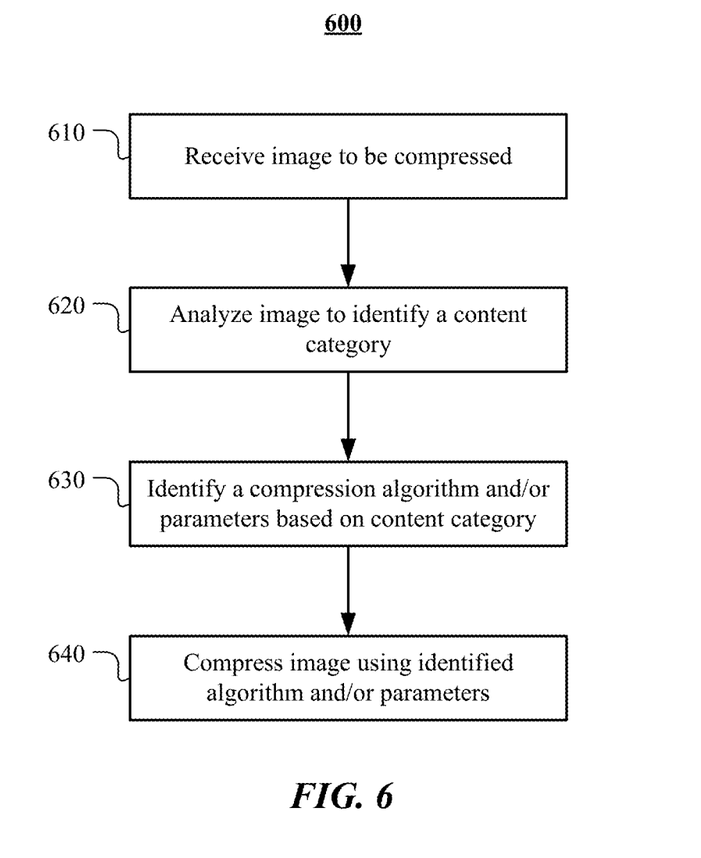
FIG. 6 illustrates an example method for compressing an image using a machine-learning model trained to perform image compression based on content categories.

FIG. 6 illustrates an example method 600 for compressing an image using a machine-learning model trained to perform image compression based on content categories. In particular embodiments, the method 600 may be performed either on a server 162 or on a client system 130. For example, the analysis to identify the parameters (e.g., image segmentation) as well as the compression may be performed on the client system 130 and/or on the server 162. The method may begin at step 610 by receiving an image to be compressed. At step 620, the method may analyze the image to identify a content category. The content category may be a category of an object depicted in the image. The object used to determine the category may be a primary subject of the image. The primary subject may be the most prominent object in the image, e.g., the largest, brightest, most colorful, highest-contrast, categorized with the highest confidence, or center-most of the objects in the image. The primary subject of the image may be selected based on an affinity of a user capturing the image with one or more different objects detected in the image. At step 630, the method may identify a compression algorithm and/or parameters based on the content category. At step 640, the method may compress the image using the identified algorithm and/or parameters.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order.

Moreover, although this disclosure describes and illustrates an example method for assessing the quality and size-reduction of a compressed image including the particular steps of the method of FIG. 6, this disclosure contemplates any suitable method for assessing the quality and size-reduction of a compressed image including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
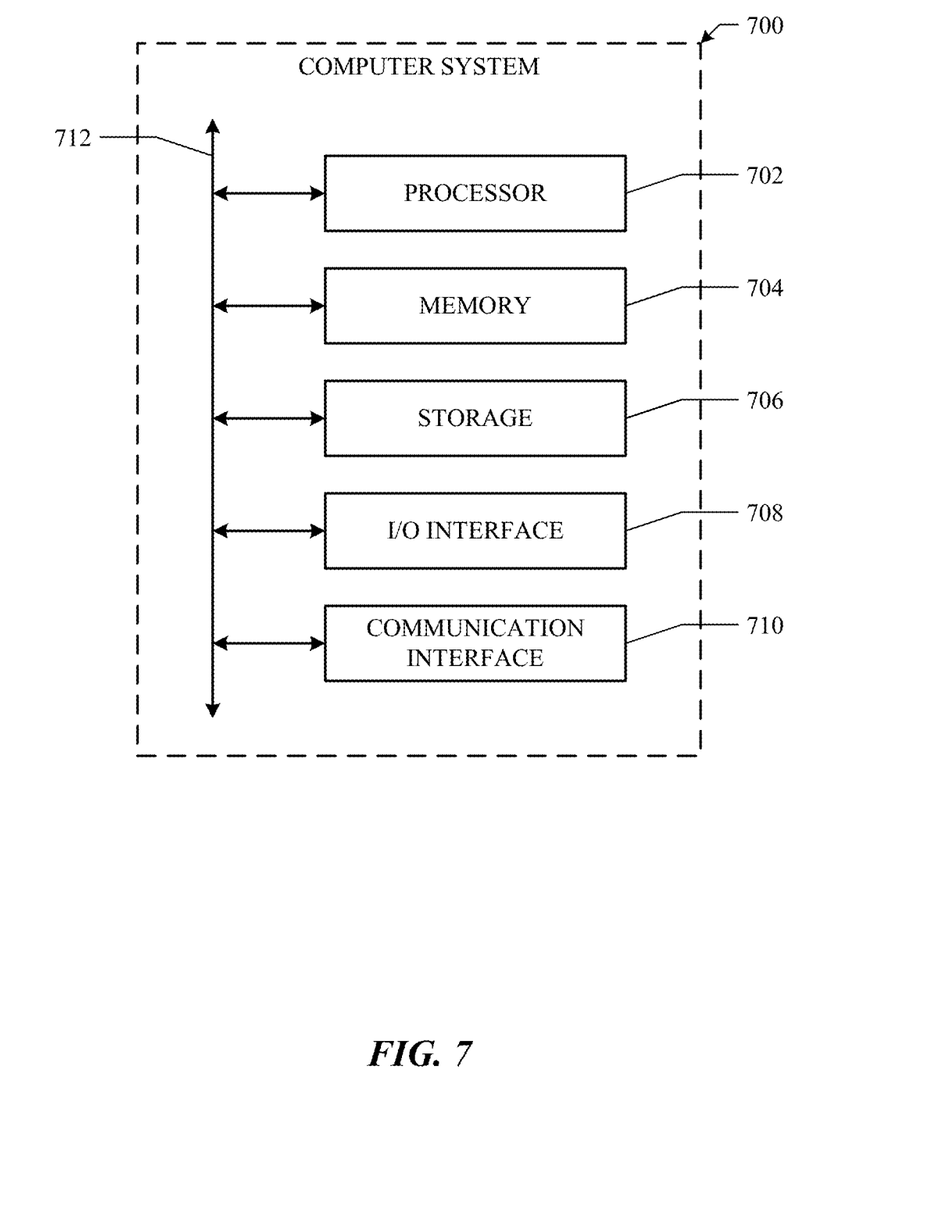
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, analyzing content of an image;
   by the computing device, identifying a category of the image based on the analyzed content of the image;
   by the computing device, identifying, based on the category of the image, a set of one or more compression parameters for a compression algorithm;
   by the computing device, compressing the image using the compression algorithm, wherein the compression parameters are provided as input to the compression algorithm;
   wherein the set of compression parameters is identified based on the category using a machine-learning model that maps one or more categories to corresponding sets of compression parameters for compressing imaged to generate corresponding compressed images; and
   wherein the machine-learning model is trained to map the categories to the corresponding sets of compression parameters unit one or more mappings, and the model is trained by:
      identifying a candidate parameter set, wherein the candidate parameter set is one of a plurality of candidate parameter sets to be used as input to the compression algorithm to compress a training image selected from a plurality of training images;
      generating a compressed image from the training image using the compression algorithm, wherein the candidate parameter set is provided as input to the compression algorithm;
      determine a quality of the compressed image using an objective function that compares the compressed image to the training image;

identifying a category of the training image and establishing, as one of the mappings, a mapping between the category of the training image and the candidate parameter set when a threshold condition based at least on the quality of the compressed image is satisfied; and wherein the machine learning model is further trained by:
determining, based on a size of the compressed image and a size of the training image, a reduction factor that represents an amount of reduction in the size of the compressed image generating using the compression algorithm and the candidate parameter set, and
wherein the threshold condition is satisfied when a combination of the quality and the reduction in size is a maximum of combinations of the quality and the reduction in size corresponding to the candidate parameter sets used as input to the compression algorithm for the content category of the training image.

2. The method of claim 1, wherein the category of the image comprises a category of an object depicted in the image, and identifying the category of the image comprises:
by the computing device, detecting one or more objects in the image;
by the computing device, selecting a primary subject of the image from the objects in the image; and
by the computing device, identifying a category of the primary subject, wherein the category of the image comprises the category of the primary subject.

3. The method of claim 2, wherein the primary subject is the largest of the objects in the image.

4. The method of claim 2, wherein the category of the primary subject is identified by an image segmentation algorithm.

5. The method of claim 1, wherein the image compression algorithm comprises JPEG, GIF, TIFF, or PNG.

6. The method of claim 1, wherein the compression parameters comprise bit rate, compression quality, quantization table, or a combination thereof.

7. The method of claim 1, wherein the threshold condition is satisfied when the quality is greater than a threshold value.

8. The method of claim 1, wherein the combination of the quality and the reduction in size comprises a sum of the quality and the reduction in size.

9. The method of claim 1, wherein the candidate parameter set includes one or more first compression parameters, and each first compression parameter is selected from a range of values.

10. The method of claim 1, wherein the machine learning model is further trained by:
when the quality of the compressed image does not satisfy the threshold, replacing at least one of the first compression parameters in the candidate parameter set with at least one second compression parameter, and repeating the steps of:
generating a compressed image, determining a quality of the compressed image, and identifying a category of the training image and establishing a mapping between the category of the training image and the candidate parameter set when the quality of the compressed image satisfies a threshold.

11. The method of claim 1, wherein the compression algorithm is identified based on the category using a machine-learning model that maps one or more categories to corresponding compression algorithms.

12. The method of claim 11, wherein the machine-learning model is trained, based on training data, to map the categories to the corresponding compression algorithms, the training data comprising a plurality of training images, and the machine-learning model is trained by:
identifying a candidate compression algorithm;
generating a compressed image from one of the training images using the candidate compression algorithm, wherein a candidate parameter set is provided as input to the candidate compression algorithm;
determining a quality of the compressed image using an objective function that compares the compressed image to the training image; and
identifying a category of the training image and establishing a mapping between the category of the training image and the candidate compression algorithm when the quality of the compressed image satisfies a threshold.

13. The method of claim 1, wherein the category of the image comprises a style of the image, and the style of the image comprises a true-color photograph or a clipart image.

14. The method of claim 1, wherein the category of the image is identified based on a frequency domain representation of the image.

15. The method of claim 1, wherein the image is a frame of a video.

16. One or more computer-readable non-transitory storage media embodying software that is operable when executed to:
analyze content of an image;
identify a category of the image based on the analyzed content of the image;
identify, based on the category of the image, a set of one or more compression parameters for a compression algorithm; and
compress the image using the compression algorithm, wherein the compression parameters are provided as input to the compression algorithm;
wherein the set of compression parameters is identified based on the category using a machine-learning model that maps one or more categories to corresponding sets of compression parameters for compressing imaged to generate corresponding compressed images; and
wherein the machine-learning model is trained to map the categories to the corresponding sets of compression parameters unit one or more mappings, and the model is trained by:
identifying a candidate parameter set, wherein the candidate parameter set is one of a plurality of candidate parameter sets to be used as input to the compression algorithm to compress a training image selected from a plurality of training images;
generating a compressed image from the training image using the compression algorithm, wherein the candidate parameter set is provided as input to the compression algorithm;
determine a quality of the compressed image using an objective function that compares the compressed image to the training image;
identifying a category of the training image and establishing, as one of the mappings, a mapping between the category of the training image and the candidate parameter set when a threshold condition based at least on the quality of the compressed image is satisfied; and
wherein the machine learning model is further trained by:

determining, based on a size of the compressed image and a size of the training image, a reduction factor that represents an amount of reduction in the size of the compressed image generating using the compression algorithm and the candidate parameter set, and wherein the threshold condition is satisfied when a combination of the quality and the reduction in size is a maximum of combinations of the quality and the reduction in size corresponding to the candidate parameter sets used as input to the compression algorithm for the content category of the training image.

17. A system comprising: one or more processors; and a memory coupled to the processors comprising instructions executable by the processors, the processors being operable when executing the instructions to:

analyze content of an image;

identify a category of the image based on the analyzed content of the image;

identify, based on the category of the image, a set of one or more compression parameters for a compression algorithm; and compress the image using the compression algorithm, wherein the compression parameters are provided as input to the compression algorithm;

wherein the set of compression parameters is identified based on the category using a machine-learning model that maps one or more categories to corresponding sets of compression parameters for compressing imaged to generate corresponding compressed images; and wherein the machine-learning model is trained to map the categories to the corresponding sets of compression parameters unit one or more mappings, and the model is trained by:

identifying a candidate parameter set, wherein the candidate parameter set is one of a plurality of candidate parameter sets to be used as input to the compression algorithm to compress a training image selected from a plurality of training images;

generating a compressed image from the training image using the compression algorithm, wherein the candidate parameter set is provided as input to the compression algorithm;

determine a quality of the compressed image using an objective function that compares the compressed image to the training image;

identifying a category of the training image and establishing, as one of the mappings, a mapping between the category of the training image and the candidate parameter set when a threshold condition based at least on the quality of the compressed image is satisfied; and wherein the machine learning model is further trained by:

determining, based on a size of the compressed image and a size of the training image, a reduction factor that represents an amount of reduction in the size of the compressed image generating using the compression algorithm and the candidate parameter set, and wherein the threshold condition is satisfied when a combination of the quality and the reduction in size is a maximum of combinations of the quality and the reduction in size corresponding to the candidate parameter sets used as input to the compression algorithm for the content category of the training image.

* * * * *